United States Patent
Lundin

(10) Patent No.: US 9,683,344 B2
(45) Date of Patent: Jun. 20, 2017

(54) OIL COLLECTOR

(71) Applicant: M & L Patent OY AB, Hanko (FI)

(72) Inventor: Lars Ingram Lundin, Hanko (FI)

(73) Assignee: M & L Patent Oy Ab, Hanko (FI)

( * ) Notice: Subject to any disclaimer, the term of this patent is extended or adjusted under 35 U.S.C. 154(b) by 62 days.

(21) Appl. No.: 14/410,575

(22) PCT Filed: Jun. 10, 2013

(86) PCT No.: PCT/FI2013/050623
§ 371 (c)(1),
(2) Date: Dec. 23, 2014

(87) PCT Pub. No.: WO2014/001613
PCT Pub. Date: Jan. 3, 2014

(65) Prior Publication Data
US 2015/0345093 A1 Dec. 3, 2015

(30) Foreign Application Priority Data
Jun. 25, 2012 (FI) ...................................... 20125704

(51) Int. Cl.
*E02B 15/10* (2006.01)
*E02B 15/04* (2006.01)

(52) U.S. Cl.
CPC .......... *E02B 15/048* (2013.01); *E02B 15/103* (2013.01); *E02B 15/102* (2013.01); *E02B 15/104* (2013.01)

(58) Field of Classification Search
CPC ...... E02B 15/048; E02B 15/10; E02B 15/102; E02B 15/103; E02B 15/104

USPC ... 210/170.05, 170.09, 170.11, 242.3, 242.4, 210/923, 924
See application file for complete search history.

(56) References Cited

U.S. PATENT DOCUMENTS

| | | | | |
|---|---|---|---|---|
| 3,617,555 A | * | 11/1971 | Ginsburgh | E02B 15/104 210/242.4 |
| 4,264,450 A | | 4/1981 | Ayers et al. | |
| 4,978,448 A | * | 12/1990 | Terokomos | E02B 15/104 210/242.3 |
| 5,043,064 A | * | 8/1991 | Abell | E02B 15/103 210/242.3 |
| 5,137,630 A | * | 8/1992 | Eklund | E02B 15/102 210/242.3 |
| 2010/0170844 A1 | * | 7/2010 | Hobson | E02B 15/103 210/396 |

FOREIGN PATENT DOCUMENTS

| | | |
|---|---|---|
| EP | 0128729 A2 | 12/1984 |
| FI | 2659 U | 11/1996 |
| WO | WO 9739194 | 10/1997 |
| WO | WO 9964683 A1 | 12/1999 |

* cited by examiner

*Primary Examiner* — Christopher Upton
(74) *Attorney, Agent, or Firm* — Seppo Laine Oy

(57) ABSTRACT

The invention relates to an oil collector including a brush (3), provided with substantially straight bristles (1) and a horizontal shaft (2), and a cleaning structure in the upper part of the brush for cleaning the brush from oil. According to the invention, the bristles (1) of the brush (3) are substantially parallel to the horizontal shaft (2).

7 Claims, 3 Drawing Sheets

OIL COLLECTOR

FIELD OF THE INVENTION

Figure 1:
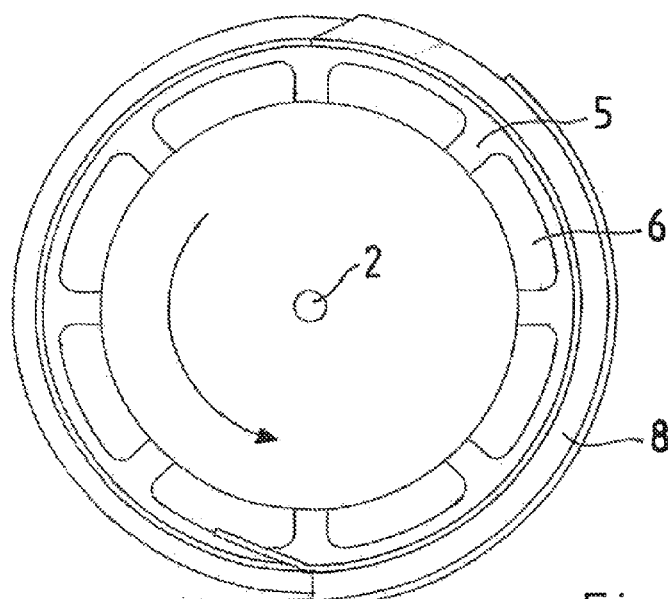

The invention relates to an oil collector as defined in the preamble of claim 1.

BACKGROUND OF THE INVENTION

A traditional means that has been tried and found to be relatively good in collecting oil from water is a skimmer, i.e. a brush rotated partly in water and partly above the water, wherein the oil adheres to the bristles of the brush and is carried out of the water with the rotation of the brush. The bristles are then cleaned above the water by an appropriate comb structure before rolling once again back into the oily water. A structure based on bristles may be formed by one drum-type brush or alternatively by a brush cassette wherein a belt provided with bristles circulates between two rotating rolls.

However, problems are caused in the prior art by the operation of the brushes particularly in icy oil. Bits of ice are easily caught between radially extending bristles but are not adhered to the bristles; instead, they slip out, bringing along the oil adhered to the bristles. Furthermore, the oil retention capacity of the bristles is not fully satisfactory because the mere centrifugal force of rotation tends to draw oil away from the surfaces of the radial bristles. Thus, the rotational speed of the brushes must be kept quite low so as to prevent back flow of the oil.

OBJECTIVE OF THE INVENTION

The objective of the invention is to remedy the above-mentioned defects. Specifically, the objective of the invention is to disclose a novel brush structure which is applicable for oil collection, which collects oil better than the prior art, which does not collect any bits of ice from the oil and which keeps the oil better in the bristles until cleaning.

SUMMARY OF THE INVENTION

The oil collector according to the invention is characterized by what has been presented in claim 1.

The oil collector according to the invention includes a brush provided with substantially straight bristles and a horizontal shaft, and a suitable cleaning structure, such as a comb structure, at the upper part of the brush for cleaning the brush from oil. According to the invention, the bristles of the brush are substantially parallel to the horizontal axis of rotation of the brush. Thus, the straight bristles of the brush rotate in the transverse direction, i.e. meet the surface of oily water to be cleaned sideways, i.e. simultaneously over their entire length. In the same way, they rise transversely from the water being cleaned, whereby the centrifugal force caused by the rotation of the brush does not slide the oil in the longitudinal direction of the bristles along the surface thereof; instead, the centrifugal force is exerted on the surface of the bristles in the perpendicular direction. When the bristles are side by side and nearly attached to each other, the oil stays effectively between the bristles and attached to their surfaces.

It is obvious to a person skilled in the art what is meant by the substantially axial orientation of the bristles herein. It is clearly explained in the description how the brush operates differently if the bristles are disposed radially or axially. Since the bristles are made of a flexible material that changes its direction during use to some extent, it is not reasonable to assume that the bristles be exactly axial at all times. As early as in the manufacturing stage, the bristles that are attached in tight bundles spread out at different angles to some extent, even if they were attached in exactly axial holes or in another exactly axial fashion. Thus, the direction of the bristles is appropriately in practice in the range of ±20°, preferably ±10°, for example approximately ±5° from the axial direction of the brush.

Appropriately, the oil collector is constructed such that it comprises a solid drum and a circular brush support attached on the outer perimeter of the drum. As the brush support is further provided with flow openings, the water that has flowed through the brushes is able freely to flow on the surface of the drum out from both ends of the drum in the axial direction.

Preferably, the brush includes a brush body attached to the brush support, and bristles attached to the brush body. Further, as the bristles extend from the brush body in two directions, i.e. opposed axial directions, the brush structure can be made a compact and tight, well oil collecting structure.

The oil collector according to the invention may be a drum-type and cylindrical structure rotating on one shaft. A second alternative is that the oil collector is a belt-type structure circulating on two shafts.

In both alternatives mentioned above, it is preferred that the oil collector includes a casing which is provided on the path of the brush and along which the oily brush is arranged to travel from the oily water to the cleaning comb structure. Thus, the casing prevents the dropping of oil back into the water from the brushes and, on the other hand, the brushes carry the oil dropped into the casing up to the comb-type cleaning members. Preferably, the casings are so shaped that they initially contract in a wedge-type and even fashion, whereby they press on the bristles. This suitable pressure removes water from between the bristles and leaves mainly just the oil attached to the bristles.

A highly preferred embodiment of the invention is a brush structure where the inventively transverse bristles are at least partly of different thicknesses. The thickest bristles are disposed at the front, i.e. meet the water to be cleaned first, and the thinner bristles are disposed deeper in the brush. Thus, particularly under ice conditions, the thicker and sturdier bristles effectively prevent the access of ice through the bristles into the brush. At the same time, the thinner bristles inside the brush bind the oil that has travelled therein to the surfaces of the bristles while letting the water flow therethrough. In terms of thickness, the bristles may be provided for example in three different thicknesses, i.e. three layers of bristles of different thicknesses, the thickest outmost and the thinnest inmost. It is also possible that the thickness of the bristles is changed, i.e. reduced, in a nearly stepless manner from the outer surface towards the inner surface.

The oil collector according to the invention has considerable advantages as compared to the prior art. The brush structure according to the invention collects oil to the bristles better than the radial bristles, the oil is kept better attached to the bristles up to their removal and the bristles do not let ice pass through, which makes the collecting outcome better. Thus, by the brush structure according to the invention, the speed of rotation of the device can be kept higher than with the traditional brushes, whereby the oil collecting capacity is considerably higher.

Further, the brush structure according to the invention operates as an effective filter, whereby, depending on the quality and thickness of the bristles being used and on the fluid being treated, the brush structure suitably admits, recovers or prevents the passage for different components of the fluid.

LIST OF FIGURES

Figure 2:
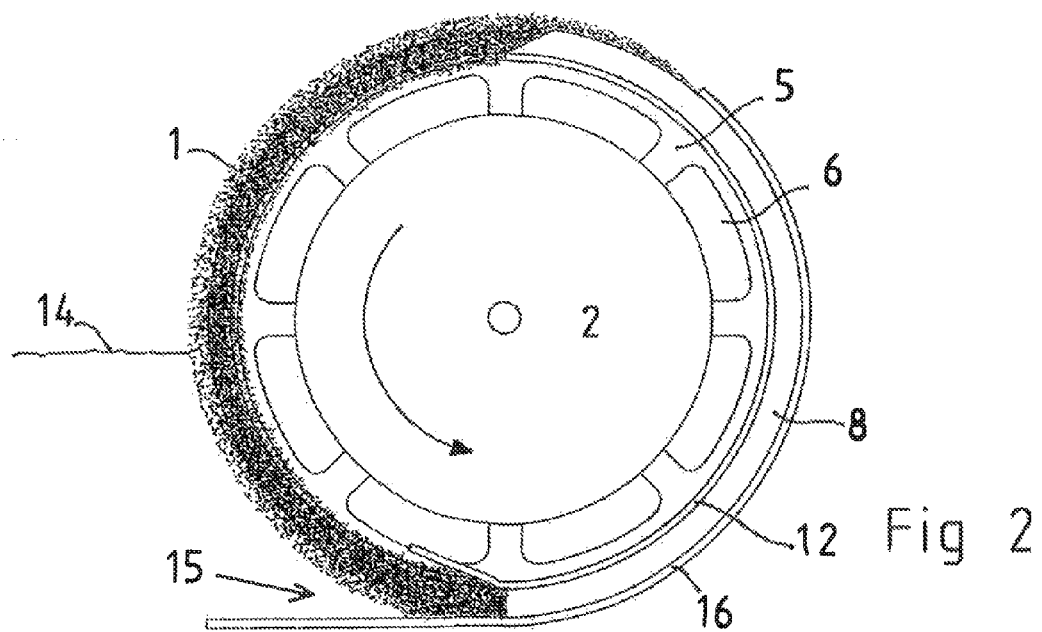
Figure 3:
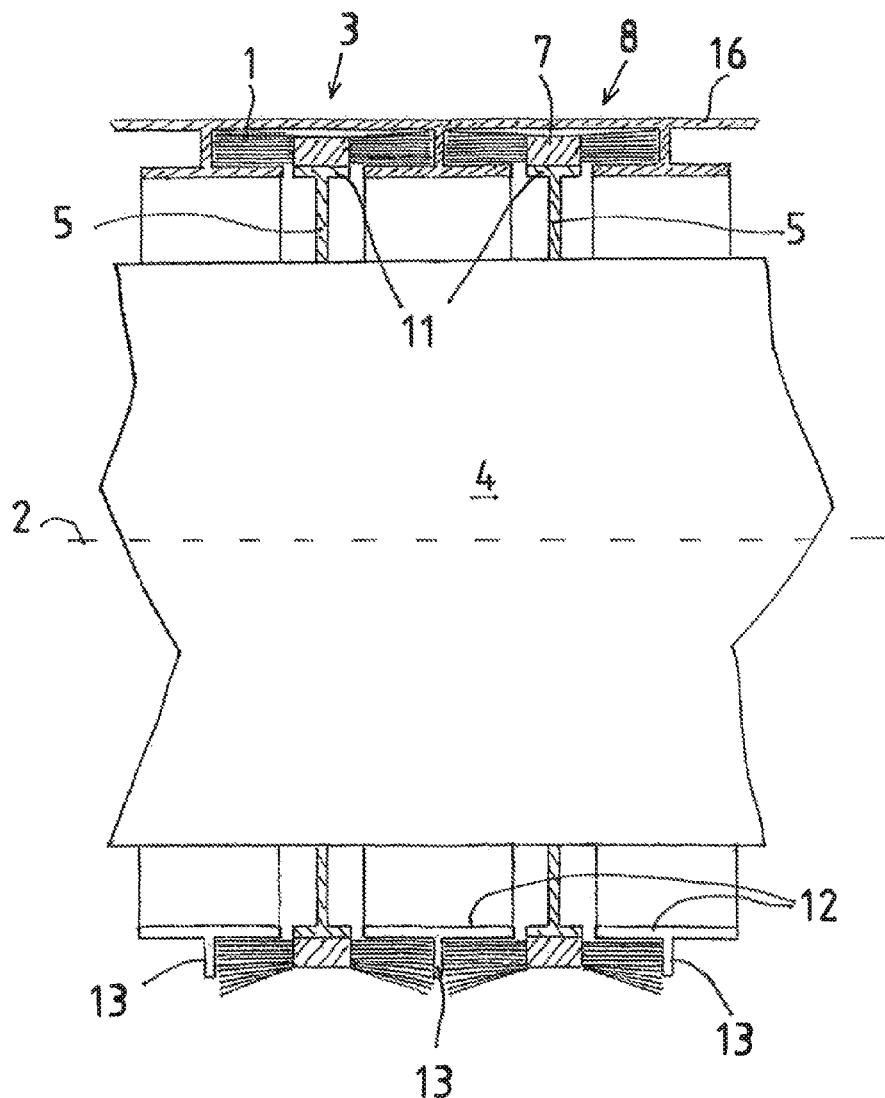
Figure 4:
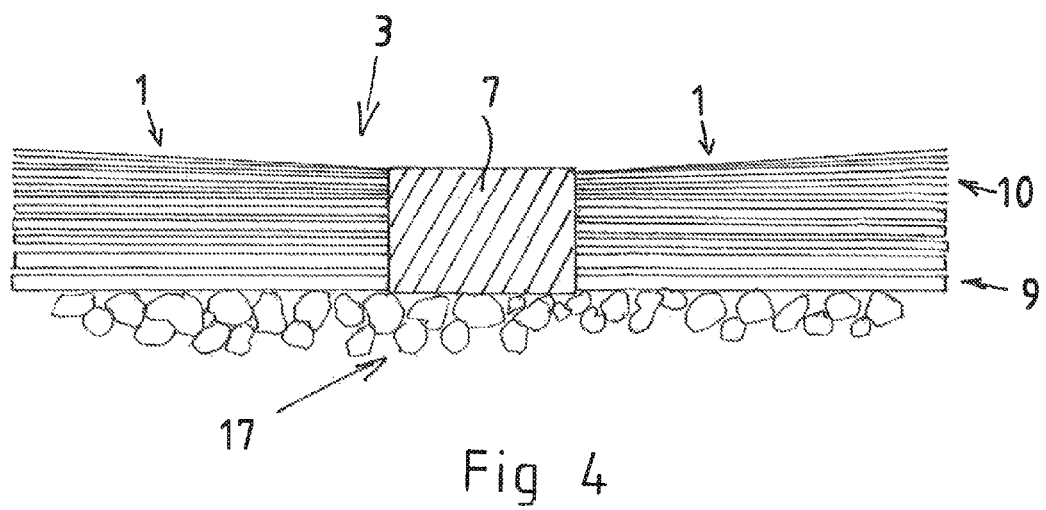
Figure 5:
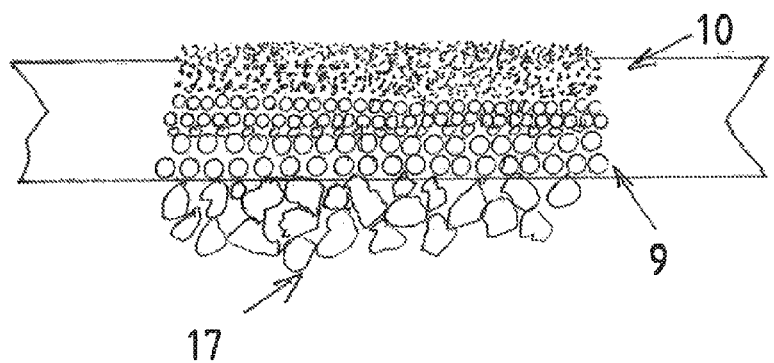

Below, the invention will be described in detail by means of examples with reference to the accompanying drawings, in which FIG. 1 illustrates a side view of one oil collector according to the invention without bristles, FIG. 2 illustrates a side view of the oil collector of FIG. 1 with the bristles, FIG. 3 illustrates a sectional view of the oil collector of FIG. 2, FIG. 4 illustrates one brush structure according to the invention and FIG. 5 illustrates the brush structure of FIG. 4 from another direction.

DETAILED DESCRIPTION OF THE INVENTION

FIG. 1-3 illustrate the essential parts of one oil collector according to the invention. The oil collector includes a solid drum 4 with a horizontal shaft 2. In other words, the shaft 2 is parallel to the surface of water. A circular flange, i.e. a brush support 5, is mounted on the outer surface of the drum to circulate the drum. There is an appropriate number of brush supports spaced apart from one another in the axial direction. A plate-type attachment flange 11 that is perpendicular to the brush support circulates the outer perimeter of the brush support. The brush support 5 is provided, substantially over its entire length, with flow openings 6 allowing the water axially to flow on the surface of the drum 4.

A brush body 7 of the brush 3 is attached to the attachment flange 1 and circularly extends around the entire structure. Bristles are attached to the brush body 7 over the entire length of the perimeter thereof on two opposed sides thereof such that the bristles extend in opposed directions from the brush body in the axial direction of the drum. As illustrated at the lower edge of FIG. 3, the bristles of the brush always spread out to some extent, such that not all of them are fully provided in said axial direction. However, in this invention the substantially axial direction of the brushes means that said axial direction is the main direction thereof.

In the oil collecting area or in FIG. 2 below the water surface 14 up to the lowest point of the brush, the bristles are able freely to spread out to some extent both inward and outward while the water flows through the bristles and out from the flow openings 6. From the flowing water, the oil adheres to the bristles and travels with the bristles towards a mouth 15. The mouth 15 is formed by a cylindrical inner surface 12 which is part of the body of the device and by a cylindrical outer surface 16. Further, edge flanges 13 are attached therebetween to connect them to one another. Thus, the brushes are pressed together to a certain extent in a casing between the outer surface 16, the inner surface 12 and the edge flanges 13, which causes squeezing of the water out from the bristles. Thus, mainly just the oil remains in the bristles as they slide upwards in the casing towards the comb structure for cleaning the bristles.

FIGS. 4 and 5 illustrate in more detail a preferred embodiment of the invention, wherein the bristles 1 of the brushes 3 are of different thicknesses such that the bristles 9 of the outer perimeter on the front, i.e. the oil collecting side, are thicker while the bristles 10 on the side of the inner perimeter are thinner. In the illustrated embodiment, the distribution of the bristles according to thickness is even more detailed, i.e. in the middle of the brush there are bristles having a thickness between the thicknesses of the outer bristles and the inner bristles.

As shown in FIG. 4, the thick and stiff bristles 9 of the front edge function as a good barrier for bits of ice 17, preventing the access thereof into the bristles. Thus, only water and oil are able to flow into the bristles, wherein, as the bristles become thinner and their number increases, the oil adheres to the bristles and only water is finally able to pass through the bristles to exit the device.

The invention is not limited merely to the examples referred to above; instead, many variations are possible within the scope of the inventive idea defined by the claims.

The invention claimed is:

1. An oil collector comprising:
   a brush, provided with substantially straight bristles,
   a horizontal shaft,
   a solid drum,
   a circular brush support including flow openings to enable the flow of water axially on the surface of the drum,
   and a cleaning structure in the upper part of the brush for cleaning the brush from oil,
   wherein the bristles of the brush are substantially parallel to the horizontal shaft, the bristles of an outer perimeter of the brush are larger in cross section than bristles of an inner perimeter of the brush, and the brush support is attached to the outer perimeter of the solid drum.

2. The oil collector according to claim 1, wherein the brush includes a brush body attached to the brush support and bristles attached to the brush body.

3. The oil collector according to claim 2, wherein the bristles extend in opposed axial directions from the brush body.

4. The oil collector according to claim 1, wherein the oil collector is a drum-type structure rotating on one shaft.

5. The oil collector according to claim 1, wherein the oil collector is a belt-type structure circulating on two shafts.

6. The oil collector according to claim 1, further comprising a casing which is provided on the path of the brush and along which an oily brush is arranged to travel to the cleaning structure for cleaning from oily water.

7. The oil collector according to claim 1, wherein the direction of the bristles is in the range of ±20° from the axial direction of the brush.

* * * * *